(12) United States Patent
Bowe

(10) Patent No.: US 7,351,750 B2
(45) Date of Patent: Apr. 1, 2008

(54) METHOD FOR PRODUCING LONG-CHAIN HYDROCARBONS FROM NATURAL GAS

(75) Inventor: Michael Joseph Bowe, Preston (GB)

(73) Assignee: CompactGTL PLC, London (GB)

(*) Notice: Subject to any disclaimer, the term of this patent is extended or adjusted under 35 U.S.C. 154(b) by 159 days.

(21) Appl. No.: 10/544,344

(22) PCT Filed: Feb. 25, 2004

(86) PCT No.: PCT/GB2004/000737

§ 371 (c)(1),
(2), (4) Date: Aug. 3, 2005

(87) PCT Pub. No.: WO2004/078642

PCT Pub. Date: Sep. 16, 2004

(65) Prior Publication Data

US 2006/0142400 A1    Jun. 29, 2006

(30) Foreign Application Priority Data

Mar. 5, 2003   (GB) ............................ 0304949.1

(51) Int. Cl.
*C07C 27/00* (2006.01)

(52) U.S. Cl. .......... 518/700; 518/702; 518/704; 518/705; 518/715; 518/716

(58) Field of Classification Search ............... 518/700, 518/702, 704, 705, 715, 716
See application file for complete search history.

(56) References Cited

U.S. PATENT DOCUMENTS

| | | | |
|---|---|---|---|
| 4,579,985 A | 4/1986 | Minderhoud | 585/310 |
| 5,500,449 A | 3/1996 | Benham | 518/700 |
| 6,277,894 B1 | 8/2001 | Agee | 518/700 |
| 6,322,611 B1* | 11/2001 | Engler | 95/55 |
| 6,495,610 B1 | 12/2002 | Brown | 518/706 |
| 6,497,856 B1* | 12/2002 | Lomax et al. | 423/651 |
| 6,696,501 B2* | 2/2004 | Schanke et al. | 518/705 |

FOREIGN PATENT DOCUMENTS

| | | |
|---|---|---|
| WO | 01/51194 | 7/2001 |
| WO | 03/006149 | 1/2003 |

* cited by examiner

Primary Examiner—Jafar Parsa
(74) Attorney, Agent, or Firm—William H. Holt

(57) ABSTRACT

Natural gas is reacted with steam for generating carbon monoxide and hydrogen in a first catalytic reactor. The resulting gas mixture is used to perform Fischer-Tropsch synthesis in a second catalytic reactor. After performing Fischer-Tropsch synthesis, the remaining hydrogen is separated from a hydrocarbon-rich stream using a hydrogen-permeable membrane, and the hydrocarbon-rich stream is returned to be subjected to steam reforming. Preferable, the hydrogen-rich stream is supplied to a combustion channel for providing heat for the endothermic steam-reforming reaction. The overall process converts natural gas to longer-chain hydrocarbons and can provide a carbon conversion of more than 80%.

5 Claims, 1 Drawing Sheet

METHOD FOR PRODUCING LONG-CHAIN HYDROCARBONS FROM NATURAL GAS

This invention relates to a chemical process, and to a plant including catalytic reactors suitable for use in performing the process, for producing longer-chain hydrocarbons from natural gas.

BACKGROUND OF THE INVENTION

A process is described in WO 01/51194 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquid under ambient conditions. The two stages of the process, steam/methane reforming and Fisher-Tropsch synthesis, require different catalysts, and catalytic reactors are described for each stage. The catalytic reactors enable heat to be transferred to or from the reacting gases, respectively, as the reactions are respectively endothermic and exothermic; the heat required for steam/methane reforming may be provided by combustion. However the proportions of carbon monoxide and hydrogen produced by the steam/methane reforming are not ideal for the Fischer-Tropsch synthesis. An improved way of performing this overall process has now been found.

SUMMARY OF THE INVENTION

According to the present invention there is provided a process for processing natural gas to generate longer-chain hydrocarbons, the process comprising subjecting the gas to steam reforming to generate a mixture of carbon monoxide and hydrogen, and then subjecting this mixture to Fischer-Tropsch synthesis, wherein the gas phase produced by the Fischer-Tropsch synthesis is separated into a hydrogen-rich stream and a hydrocarbon-rich stream using a hydrogen-permeable membrane, and the hydrocarbon-rich stream is returned to be subjected to steam reforming. The coolant used to obtain the liquid and gaseous phases is not refrigerated, for example, water at a temperature of about 20° C. (68° F.), and the hydrocarbon-rich stream is subjected to catalytic methanation in a pre-reformer prior to steam reforming.

Preferably the hydrogen-rich stream is supplied to a combustion channel to provide heat for the endothermic steam-reforming reaction.

The present invention also provides a plant for processing natural gas to generate longer-chain hydrocarbons, the plant comprising a reforming reactor for subjecting the gas to steam reforming to generate a mixture of carbon monoxide and hydrogen, and a reactor for subjecting this mixture to Fischer-Tropsch synthesis, the plant including a hydrogen-permeable membrane for separating the gas phase produced by the Fischer-Tropsch synthesis into a hydrogen-rich stream and a hydrocarbon-rich stream, and means to return the hydrocarbon-rich stream to the reforming reactor.

Each catalytic reactor preferably comprises a plurality of flat metal sheets in a stack, with grooves which define first and second gas flow channels, the channels being arranged alternately to ensure good thermal contact between the gases in them. Appropriate catalysts should be provided in each channel, depending on the required reaction. To ensure the required good thermal contact, in the reforming reactor both the first and the second gas flow channels are preferably less than 5 mm in the direction normal to the sheets, more preferably less than 3 mm deep, while in the Fischer-Tropsch reactor the reaction channels are preferably less than 10 mm deep. Corrugated or dimpled metallic foils, metal meshes, or corrugated or pleated metal felt sheets may be used as the substrate of a catalyst structure within the flow channels to enhance heat transfer and catalyst surface area. These catalyst structures are preferably removable from the grooves in the stack, so they can be replaced if the catalyst becomes spent.

BRIEF DESCRIPTION OF THE DRAWING

The invention will now be further and more particularly described, by way of example only, and with reference to the accompanying drawing which shows a flow diagram of a chemical plant for the process of the invention.

DETAILED DESCRIPTION OF THE INVENTION

Figure 1:
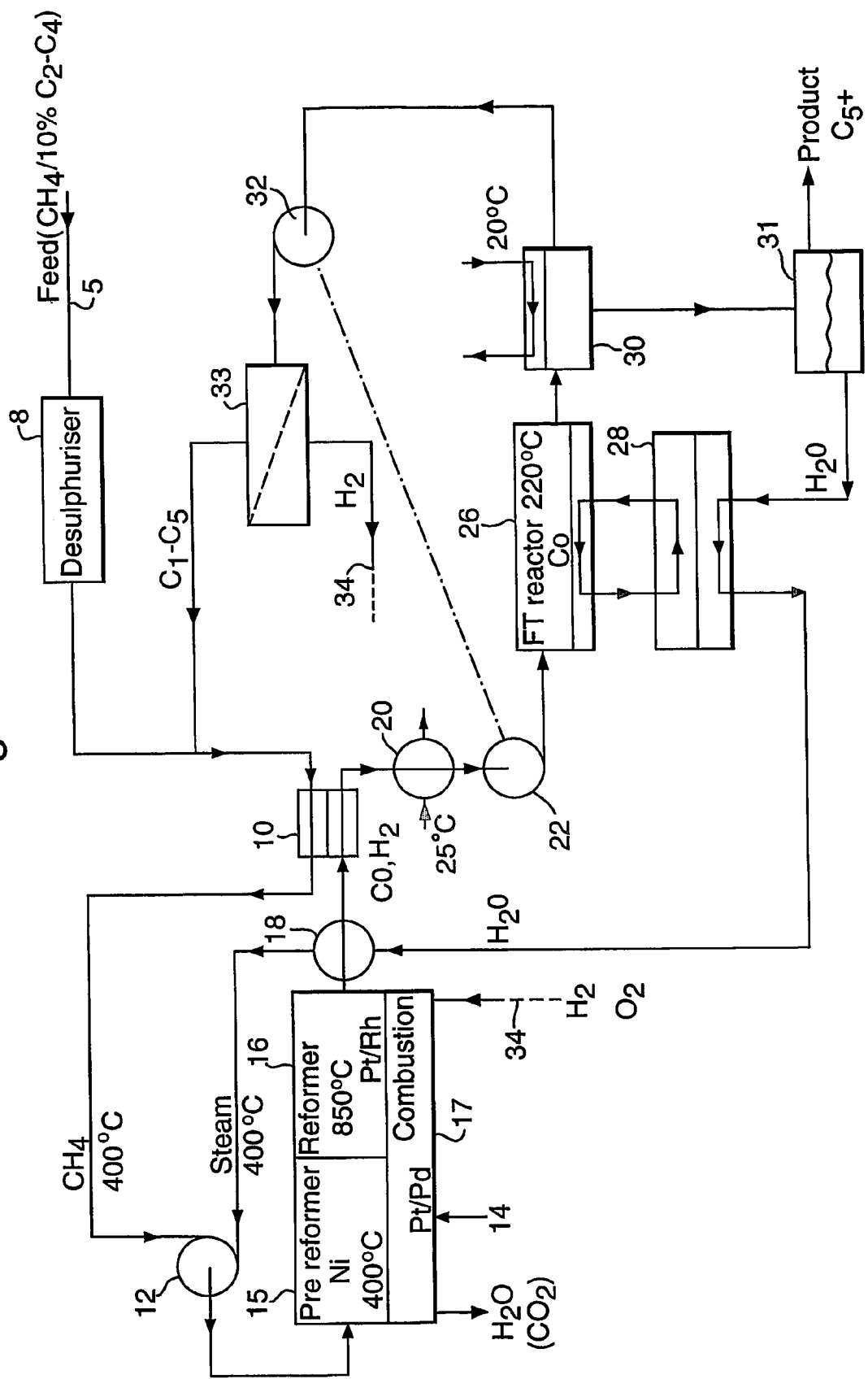

The invention relates to a chemical process for converting natural gas (primarily methane) to longer chain hydrocarbons. The first stage involves steam reforming, that is to say the reaction of the type:

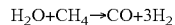

This reaction is endothermic, and may be catalysed by a rhodium or platinum/rhodium catalyst in a first gas flow channel. The heat required to cause this reaction may be provided by combustion an inflammable gas such as methane or hydrogen, which is exothermic and may be catalysed by a palladium catalyst in an adjacent second gas flow channel. In both cases the catalyst is preferably on a stabilised-alumina support which forms a coating typically less than 100 μm thick on the metallic substrate. Both these reactions may take place at atmospheric pressure, although alternatively the reforming reaction might take place at an elevated pressure. The heat generated by the combustion would be conducted through the metal sheet separating the adjacent channels.

The gas mixture produced by the steam/methane reforming can then be used to perform a Fischer-Tropsch synthesis to generate a longer chain hydrocarbon, that is to say:

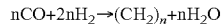

which is an exothermic reaction, occurring at an elevated temperature, typically between 200 and 300° C., for example 220° C., and an elevated pressure typically between 2 MPa and 4 MPa, for example 2.5 MPa, in the presence of a catalyst such as iron, cobalt or fused magnetite, with a potassium promoter. The exact nature of the organic compounds formed by the reaction depends on the temperature, the pressure, and the catalyst, as well as the ratio of carbon monoxide to hydrogen. The heat given out by this synthesis reaction may be used to provide at least part of the heat required by the steam/methane reforming reaction, for example a heat transfer fluid may be used to transfer the heat from a reactor in which the Fischer-Tropsch synthesis is occurring, the heat being used to preheat at least one of the gas streams supplied to the reforming reactor. The preferred catalyst for the Fischer-Tropsch synthesis comprises a coating of γ-alumina of specific surface area 140-230 m²/g with about 10-40% cobalt (by weight compared to the alumina), and with a ruthenium, platinum or gadolinium promoter which is less than 10% the weight of the cobalt, and with a basicity promoter such as thoria.

Referring now to the drawing, the plant for the overall chemical process is shown. The feed gas 5 consists primarily of methane, with a small percentage (say 10%) of ethane and propane. It is passed through a heat exchanger 10 so it is at about 400° C. and is then supplied via a fluidic vortex mixer 12 to a first catalytic reactor 14; in the mixer 12 the feed gas is mixed with a stream of steam that is also at about 400° C., the streams entering the mixer 12 through tangential inlets and following a spiral path to an axial outlet so they become thoroughly mixed. Both streams may be at atmospheric pressure, or for example at a pressure of say 100 kPa above atmospheric. The flows are preferably such that the steam:methane molar ratio (at the steam/methane reforming stage) is between 1.3 and 1.6, preferably 1.4 to 1.5. The first part of the reactor 14 is a pre-reformer 15 with a nickel or platinum/rhodium methanation catalyst, in which the higher alkanes react with the steam to form methane (and carbon monoxide); extra steam is evidently required to ensure the specified steam/methane ratio is achieved. This pre-reformer 15, which may be a separate reactor, would not be required if the feed gas 10 contained substantially no higher alkanes. The second part of the reactor 14 is a reformer 16 with a platinum/rhodium catalyst, in which the methane and steam react to form carbon monoxide and hydrogen. The temperature increases gradually from about 350° C. at the start of the pre-reformer 15 to about 850° C. in the reformer 16.

If the feed gas 5 contains any sulphur-containing compounds it is passed through a desulphurisation unit 8 before reaching the first catalytic reactor 14. As shown in the drawing this unit 8 may treat the gas at its initial temperature, for example using liquid scrubbing absorption. Alternatively, it may use a desulphurisation technique that requires elevated temperatures, for example a solid state absorption process, and instead be arranged to treat the gas 5 after it has passed through the heat exchanger 10.

The heat for the endothermic reactions in the reactor 14 may be provided by combustion (e.g. of methane or hydrogen) over a palladium or platinum catalyst within adjacent gas flow channels 17. The catalyst may include γ-alumina as a support, coated with a palladium/platinum 3:1 mixture, which is an effective catalyst over a wide temperature range. The combustible gas mixture preferably flows in countercurrent to the gases in the reformer 16. The combustible gas mixture may be supplied in stages along the reactor 14, to ensure combustion occurs throughout its length.

The hot mixture of carbon monoxide and hydrogen emerging from the reformer 16 is then quenched by passing through a heat exchanger 18 to provide the hot steam supplied to the vortex mixer 12, and then through the heat exchanger 10 in which it loses heat to the feed gas 5. The mixture is then further cooled to about 100° C. by passing through a heat exchanger 20 cooled by water. The gases are then compressed through a compressor 22 to a pressure of 2.5 MPa (25 atm.).

The stream of high pressure carbon monoxide and hydrogen is then supplied to a catalytic reactor 26 in which the gases react, undergoing Fischer-Tropsch synthesis to form a paraffin or similar compound. This reaction is exothermic, preferably taking place at about 220° C., and the heat generated may be used to preheat the steam supplied to the heat exchanger 18, using a heat exchange fluid circulated between heat exchange channels in the reactor 26 and a steam generator 28. During this synthesis the volume of the gases decreases. The resulting gases are then passed into a condenser 30 in which they exchange heat with water initially at about 20° C. The higher alkanes (say C5 and above) condense as a liquid, as does the water, this mixture of liquids being passed to a gravity separator 31; the separated higher alkanes can then be removed as the desired product, while the water is returned via the heat exchangers 28 and 18 to the mixer 12.

It will be appreciated, from the equations discussed above, that the steam reforming stage forms more hydrogen than is required for the Fischer-Tropsch synthesis. Consequently the gas phase emerging from the condenser 30 contains a significant quantity of hydrogen, as well as lower alkanes (say C1 to C5). This gas mixture is passed through a pressure-reducing turbine 32 and then fed to a membrane separator 33 containing a hydrogen-permeable membrane. This separates the gas mixture into a hydrogen-rich stream and a hydrocarbon-rich stream. The hydrogen-rich stream is fed through the pipeline 34 to the catalytic combustion channels 17 of the reformer 14, being combined with air to provide the necessary oxygen. The hydrocarbon-rich stream is returned to the reformer 16 via the heat exchanger 10, being recombined with the feed gas 5. This has the benefit that less of the carbon (in the form of methane) undergoes combustion, so that the carbon conversion of the overall system—from natural gas to higher molecular weight hydrocarbons—is improved. Hence a carbon conversion above 80% can be obtained.

As indicated by the chain-dotted line, electricity generated by the turbine 32 may be used to help drive the compressor 22. Alternatively some of the hydrogen-rich stream from the membrane separator 33 may be used to feed a gas turbine that drives the compressor 22 directly.

Passage through the turbine 32 will cause the gas temperature to drop, and more of the higher alkanes may condense. It may therefore also be desirable to provide a de-entrainment separator (not shown) between the turbine 32 and the membrane separator 33 to intercept any such droplets and to feed the liquid back to the gravity separator 31. The de-entrainment separator may comprise a stack of corrugated plates, or swirl tubes, or a demister pad, for example.

Feeding the hydrogen-rich gas stream into the combustion channel 17 of the reactor 14 has been found to give a more uniform temperature distribution, and also enables the combustion reaction to be initiated more readily when the reactor is cold (as catalytic combustion can then occur at a temperature as low as 15 or 20° C.). The overall thermal efficiency of the process is improved, the amount of methane fed directly to the combustion channels is decreased or possibly reduced to zero, and the emission of carbon dioxide to the environment is reduced or prevented.

The gases emerging from the combustion channels 17 consist primarily of water vapour (and nitrogen, if the combustible gas mixture contained air), with possibly some carbon dioxide if any methane was added to the combustible gas mixture, or if any methane had passed through the hydrogen-permeable membrane of the separator 33. If desired, this water vapour may be condensed and used to supply steam for the first catalytic reactor 14. For example it might be condensed, and combined with the water from the liquid separator 31 to be fed through the steam generator 28.

The invention claimed is:

1. A process for generating longer-chain hydrocarbons from natural gas, said process including the steps of:
    subjecting natural gas to steam reforming for generating a mixture of carbon monoxide and hydrogen,
    subjecting said mixture to Fischer-Tropsch synthesis for producing a resultant mixture,
    using a non-refrigerated coolant for cooling and separating said resultant mixture into a liquid phase comprised of longer-chain hydrocarbons and a gas phase,
    using a hydrogen-permeable membrane for separating said gas phase into a hydrogen-rich stream and a hydrocarbon-rich stream, and
    combining said hydrocarbon-rich stream with natural gas and steam for subjecting to catalytic methanation in a prereformer prior to steam reforming.

2. A process as defined in claim 1 including the step of supplying said hydrogen-rich stream to a combustion channel for providing heat to said steam reforming reaction.

3. A process as defined in claim 1 including the step of maintaining said prereformer at a temperature of about 400° C.

4. A process as defined in claim 1 including the step of using a platinum/rhodium catalyst during said step of steam reforming.

5. A process as claimed in claim 1 wherein said non-refrigerated coolant is water at about 20° C. (68° F.).

* * * * *